UNITED STATES PATENT OFFICE.

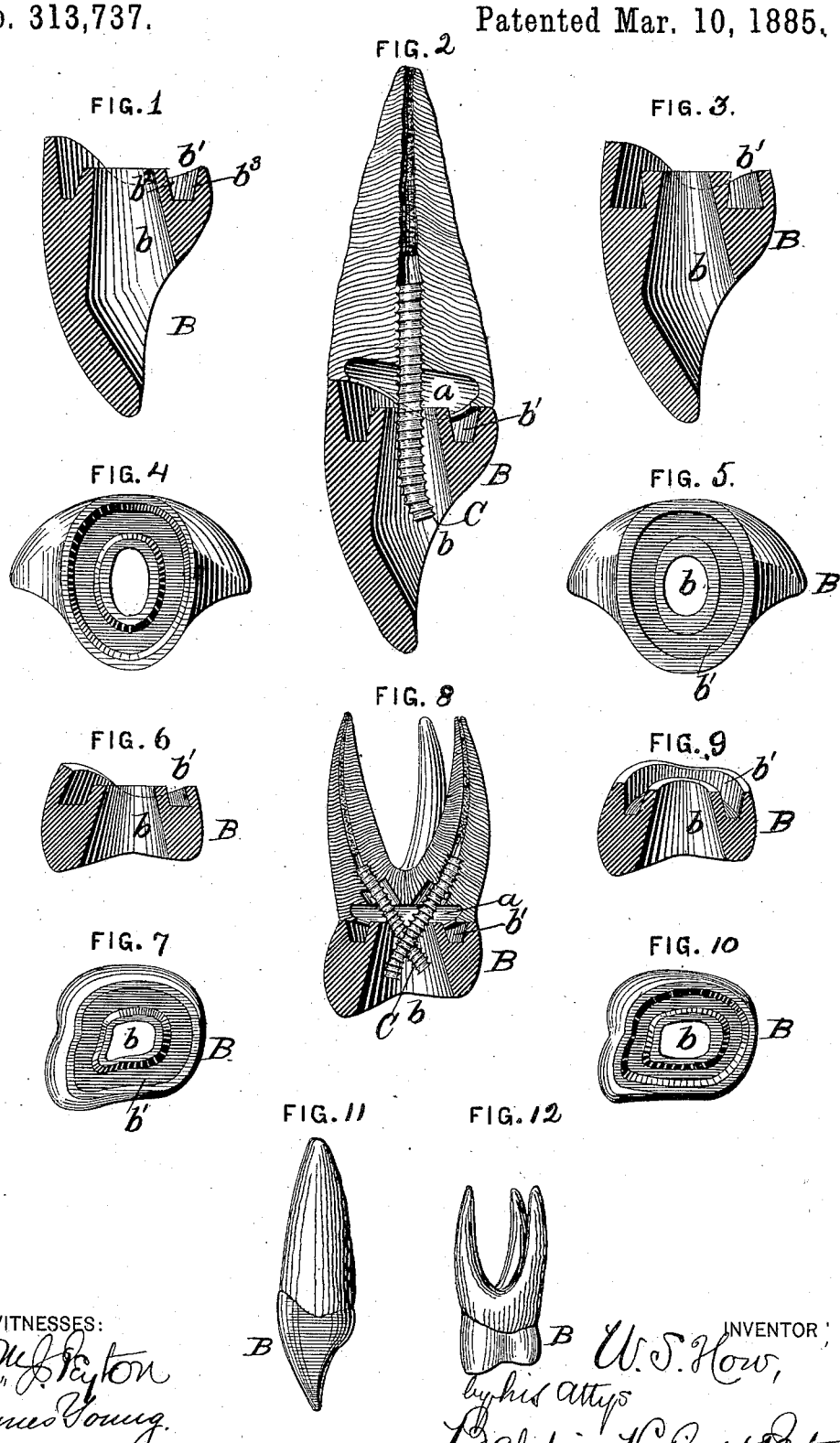

WOODBURY S. HOW, OF PHILADELPHIA, PA., ASSIGNOR TO THE S. S. WHITE DENTAL MANUFACTURING COMPANY, OF SAME PLACE.

ARTIFICIAL TOOTH-CROWN.

SPECIFICATION forming part of Letters Patent No. 313,737, dated March 10, 1885.

Application filed January 26, 1884. (No model.)

*To all whom it may concern:*

Be it known that I, WOODBURY S. HOW, of the city and county of Philadelphia, in the State of Pennsylvania, have invented certain new and useful Improvements in Artificial Tooth-Crowns, of which the following is a specification.

My invention relates to artificial tooth-crowns for use in connection with natural tooth-roots remaining in the mouth, to which the crowns are applied, so as to take the place of the natural crowns which have been removed on account of decay or other defects.

The object of my present improvement is to provide an artificial crown which admits of ready and secure attachment to the natural root and affords connection between the two which is of great strength; and a further object of my invention is to enable the crown to be readily and accurately fitted to the root, while employing the strong connection between the two which has been stated as the first object of my present improvements.

The subject-matter claimed herein is first described in detail as organized or embodied in the best ways now known to me, and is then set forth in the summary of claim at the close of the specification.

In the accompanying drawings, Figure 1 shows an incisor-tooth crown embodying my improvement. Fig. 2 is a section through the root and crown, showing the two as fitted together and provided with an anchoring post or pin, the plastic filling material which is employed in setting the crown not being shown in this figure, in order to enable the opening and recesses to be clearly shown. Fig. 3 is a sectional view of an incisor crown slightly modified. Fig. 4 is a basal plan of the crown shown in Figs. 1 and 2. Fig. 5 is a similar plan of the crown shown in Fig. 3. Fig. 6 is a section through a bicuspid crown embodying my improvements. Fig. 7 is a basal plan of a molar crown. Fig. 8 is a view of such a crown fitted in place upon a molar root, the anchoring-posts being also shown and the filling material omitted for the purpose above explained in connection with Fig. 2. Figs. 9 and 10 are respectively a section and basal plan of a molar crown; and Figs. 11 and 12 are respectively a view of a completed incisor and molar tooth having the artificial crown applied thereto.

In setting or applying my improved crowns to the natural roots remaining in the mouth, the roots are first prepared in the usual or in any improved way, so as to destroy the pulp, and are then cut or ground off preferably down to about on a line with the margin of the gum. The pulp-canal, if not of sufficient area, is then hollowed out, so as to provide a seat or space for the reception of the inner end of the anchoring-post, which aids in uniting the crown to the root, as will be more fully hereinafter explained. The outer end of the root is also preferably provided with an undercut or shouldered retaining recess or opening, $a$, for a purpose which will be presently explained.

My improved crown B may be either an incisor, cuspid, bicuspid, or molar crown, and is therefore applicable for the replacement of any natural crown that has been lost or which has become so far decayed as to necessitate its removal. The crown is provided with a longitudinal opening, $b$, which preferably extends through it substantially at the center of the crown. The opening $b$, therefore, is a preferably continuous opening through the crown, and this opening, furthermore, is preferably a funnel-shaped or tapered opening, with the smaller end thereof at the cervical end or base of the crown, whereby the opening is given a retaining function in connection with a plastic filling or cement, which aids in securing the crown to the root, as will be presently explained.

While I prefer the opening through the crown to be of inverted-cone shape, or, in other words, a tapered opening, still the opening may be a cylindrical one of substantially uniform diameter, and have its walls provided with retaining pits, grooves, or shoulders, either serially or in groups, or otherwise, to enable the plastic filling to take a firm hold of the crown. So, also, the opening may be rectangular or of other desired configuration.

The crown B is furthermore provided at its cervical end or base with a groove, channel, or recess, $b'$, which is preferably annular, or, in other words, conforming in outline to the periphery of the crown or to the shape of the lower end of the central opening.

This groove or channel preferably extends a short distance into the body of the crown, as clearly shown in the drawings, and the bottom or floor thereof is preferably flat. My improved crown, therefore, it will be seen, has a central opening, and, outside of or surrounding said opening and within the periphery of the crown, also has a circumferential channel or groove. This groove $b'$ may vary in shape in cross-section by varying the shape of the walls—that is to say, if the walls be plain or straight the channel will be a plain channel, while if the walls be tapered either in the same direction or in opposite direction the recess or channel would be varied. In Fig. 1 both the inner and outer walls of the channel or groove $b'$ are tapered, the inner wall, $b^2$, diverging from the cervical end or base of the crown, while the outer walls, $b^3$, converge or are tapered inwardly, whereby a substantially V-shaped channel or groove is formed. In Fig. 3 a reverse construction is shown—that is to say, the inner wall of the groove converges, while the outer walls diverge. The form of channel or groove, therefore, shown in Figs. 3 and 5 is a locking-groove, or, in other words, the groove is a dovetailed one. In Fig. 6 both the inner and outer walls diverge, also forming a locking or retaining groove. I thus describe and show some of the forms which can be given the cervical or basal retaining channel or groove $b'$, and obviously other forms may be employed, some of which will suggest themselves as particularly useful in certain cases.

My improved crowns are preferably what are known as "all-porcelain" crowns—that is to say, I prefer to make them of a material well known in the art as "porcelain," which is extensively used in the manufacture of artificial teeth and crowns. It will be understood, however, that my improved crowns may be made of other materials.

In fitting or applying my improved crown to the tooth-root, the root is prepared as before explained, and its edges fitted to coincide with the adjacent edges of the base of the crown. A nice fit having been secured, the post C is inserted in its place in the root, with its end projecting a short distance therefrom. A plastic filling, preferably amalgam, is now filled in the undercut recess $a$ in the end of the root, so as to surround the post C and obtain a secure anchoring connection under the walls of the recess. The cervical or basal groove $b'$ in the crown is now filled with a plastic material, preferably amalgam, and is then passed onto the end of the root, so that the projecting end of the anchoring-post enters or lies in the vertical opening $b$ in the crown. The setting operation is then completed by packing additional amalgam into the crown-opening, so as to force it down around the end of the crown, and to bring it in contact with the amalgam which fills the root-space, and also the basal groove of the crown, and thus form a solid homogeneous body of amalgam, which, when set or thoroughly amalgamated, becomes hard and solid, as is well known, and thereby constitutes a firm and solid connection between the crown and root. The amalgam filling of the crown is continued until the entire opening thereof is filled, preferably, when the lingual side, if the crown is an incisor, is finished in ways well known to dentists. From what has been said it will be seen that a very firm connection is had between the root and crown, and that the amalgam or plastic filling ramifies in different directions, so as to absolutely prevent the loosening or withdrawal of the crown, the direct withdrawal of the crown obviously being prevented by the character of the opening therein, which forms a continuous locking-shoulder, to prevent the crown from being withdrawn from off the cement filling and post.

By means of the basal channel or groove the crown, when set, is better enabled to resist the lateral strain and torsional strain to which it is subjected in use. So, also, with this advantage, I am enabled to produce a crown which is of considerable strength, and which is not liable to split or fracture during the grinding or cutting operation of the teeth. This fracture is a serious objection in some forms of porcelain crowns which have been used, in which there is a central opening tapering from the base toward the cutting or grinding edge, and with the larger end of the opening at the base of the crown. Such forms of crowns are very liable to fracture, as the pressure upon the end of the crown virtually drives the crown upon a wedge, which is formed by the anchoring-post and filling material uniting the crown to the root.

In my improved crown I obtain the advantages of an enlarged basal opening, which is desirable for strength, while at the same time I insure strength and avoid liability to fracture, because the basal channel has opposing walls, and thereby double strength at the base of the crown; and, furthermore, there is a floor or plain surface to take up the direct thrusts upon the end of the crown and relieve the walls of strains.

Having thus described my invention, what I claim herein is—

An artificial tooth-crown having a vertical opening therein, said vertical opening being surrounded by a channel, groove, or recess of undercut or retaining form, with a projecting wall between said opening and said channel, groove, or recess, substantially as described.

In testimony whereof I have hereunto subscribed my name this 23d day of January, A. D. 1884.

WOODBURY S. HOW.

Witnesses:
 WM. J. PEYTON,
 JAMES YOUNG.